US012002634B2

(12) United States Patent
Sato et al.

(10) Patent No.: US 12,002,634 B2
(45) Date of Patent: Jun. 4, 2024

(54) PRESSING MECHANISM OF PUSH SWITCH AND PUSH SWITCH

(71) Applicant: ALPS ALPINE CO., LTD., Tokyo (JP)

(72) Inventors: Hidetaka Sato, Miyagi (JP); Shinya Makino, Miyagi (JP); Naoki Hanawa, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 78 days.

(21) Appl. No.: 17/805,739

(22) Filed: Jun. 7, 2022

(65) Prior Publication Data

US 2022/0301790 A1 Sep. 22, 2022

Related U.S. Application Data

(63) Continuation of application No. PCT/JP2020/043094, filed on Nov. 18, 2020.

(30) Foreign Application Priority Data

Dec. 9, 2019 (JP) ................................ 2019-222452

(51) Int. Cl.
*H01H 13/14* (2006.01)
*H01H 13/20* (2006.01)

(52) U.S. Cl.
CPC ............ *H01H 13/14* (2013.01); *H01H 13/20* (2013.01)

(58) Field of Classification Search
CPC .. H01H 13/14; H01H 13/20; H01H 2215/036; H01H 2227/002;

(Continued)

(56) References Cited

U.S. PATENT DOCUMENTS 7,109,431 B2 * 9/2006 Yanai .................... H01H 13/48 200/341
7,816,615 B2 * 10/2010 Yanai .................... H01H 13/48 200/406

(Continued)

FOREIGN PATENT DOCUMENTS

JP S53-31966 U 8/1978
JP S57-019834 U 2/1982

(Continued)

OTHER PUBLICATIONS

International Search Report for PCT/JP2020/043094 mailed on Jan. 26, 2021.

*Primary Examiner* — Lheiren A Caroc
(74) *Attorney, Agent, or Firm* — IPUSA, PLLC

(57) ABSTRACT

A pressing mechanism of a push switch including an operation member configured to be pressed, and a leaf spring member that includes a dome portion bulging in a dome shape and an opening portion provided in a central portion of the dome portion, the leaf spring member generating a tactile sensation on the operation member by an inverting operation of the dome portion in response to being pressed by the operation member, wherein the operation member includes a first pressing portion configured to press a movable contact point member against a fixed contact point member through the opening portion and a second pressing portion configured to press the dome portion.

7 Claims, 11 Drawing Sheets

(58) Field of Classification Search
CPC .... H01H 2227/022; H01H 13/48; H01H 5/04; H01H 5/18; H01H 5/22; H01H 5/30; H01H 13/22; H01H 13/26; H01H 13/36; H01H 2215/004; H01H 2215/034
See application file for complete search history.

(56) References Cited

U.S. PATENT DOCUMENTS

| | | | | |
|---|---|---|---|---|
| 10,373,775 | B2 * | 8/2019 | Ito | H01H 13/48 |
| 2011/0056818 | A1 | 3/2011 | Maruyama et al. | |

FOREIGN PATENT DOCUMENTS

| | | | |
|---|---|---|---|
| JP | H02-148633 | | 6/1990 |
| JP | 2011-060601 | | 3/2011 |
| JP | 3179036 | U | 10/2012 |

* cited by examiner

PRESSING MECHANISM OF PUSH SWITCH AND PUSH SWITCH

CROSS-REFERENCE TO RELATED APPLICATION

The present application is a continuation application filed under 35 U.S.C. 111 (a) claiming benefit under 35 U.S.C. 120 and 365 (c) of PCT International Application No. PCT/JP2020/043094 filed on Nov. 18, 2020 and designating the U.S., which claims priority to Japanese Patent Application No. 2019-222452 filed on Dec. 9, 2019. The entire contents of the foregoing applications are incorporated herein by reference.

BACKGROUND OF THE INVENTION

1. Field of the Invention

The present disclosure relates to a pressing mechanism of a push switch and relates to the push switch.

2. Description of the Related Art

For example, Japanese Laid-Open Patent Publication No. 2011-060601 discloses a key switch device that includes a switch panel having an opening at the center thereof; a key top positioned over the switch panel; a pair of link members positioned between the key top and the switch panel and adapted to support the key top so that the key top may be moved in a vertical direction while maintaining a horizontal posture; and a membrane sheet positioned under the switch panel and adapted to close and open a contact of an electric circuit corresponding to the vertical movement of the key top; a rubber dome positioned between the membrane sheet and the key top and adapted to close the contact corresponding to the downward movement of the key top.

SUMMARY OF THE INVENTION

However, the conventional key switch device has a problem in that the rubber dome is thick and accordingly it is difficult to reduce the thickness of the key switch device. The rubber dome provides a good tactile sensation when a user touches the key top, but the thickness of the rubber dome cannot be easily reduced.

Accordingly, it is desired to provide a pressing mechanism of a push switch and to provide the push switch to achieve both a good tactile sensation and a reduction in the thickness.

According to an embodiment of the present invention, a pressing mechanism of a push switch includes an operation member configured to be pressed, and a leaf spring member that includes a dome portion bulging in a dome shape and an opening portion provided in a central portion of the dome portion, the leaf spring member generating a tactile sensation on the operation member by an inverting operation of the dome portion in response to being pressed by the operation member, wherein the operation member includes a first pressing portion configured to press a movable contact point member against a fixed contact point member through the opening portion and a second pressing portion configured to press the dome portion.

A pressing mechanism of a push switch and the push switch that achieve both a good tactile sensation and a reduction in the thickness can be provided.

DETAILED DESCRIPTION OF THE PREFERRED EMBODIMENT

Hereinafter, a pressing mechanism of a push switch and the push switch according to embodiments are explained.

First Embodiment

Figure 1:
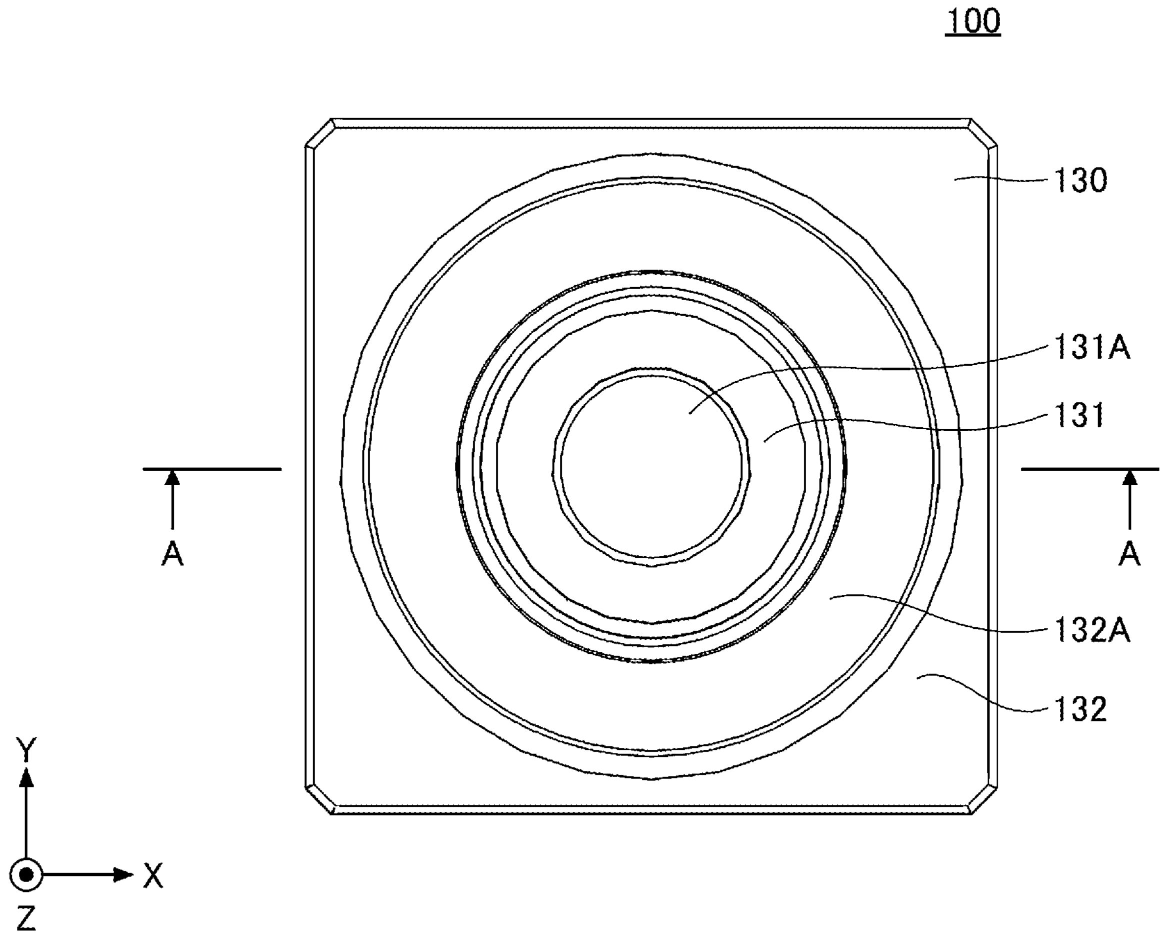
FIG. 1 is a plan view illustrating a pressing mechanism of a push switch according to a first embodiment.
Figure 2:
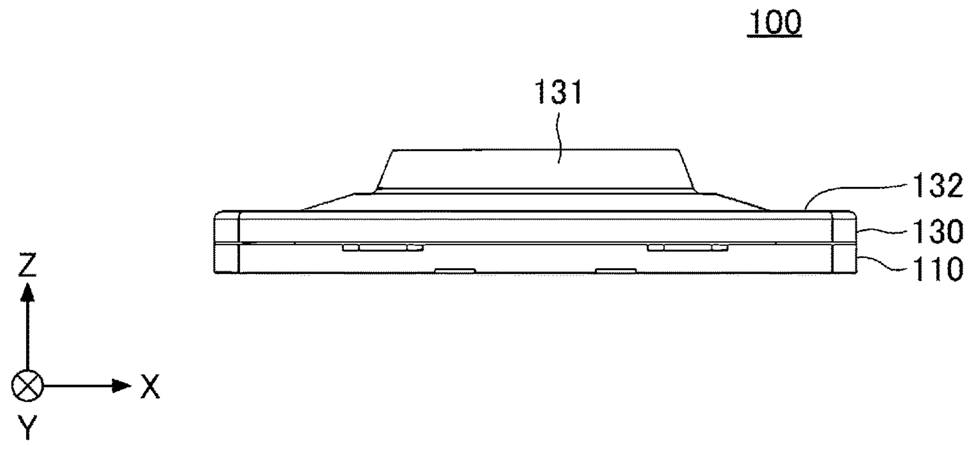
FIG. 2 is a side view illustrating the pressing mechanism of the push switch according to the first embodiment.
Figure 3:
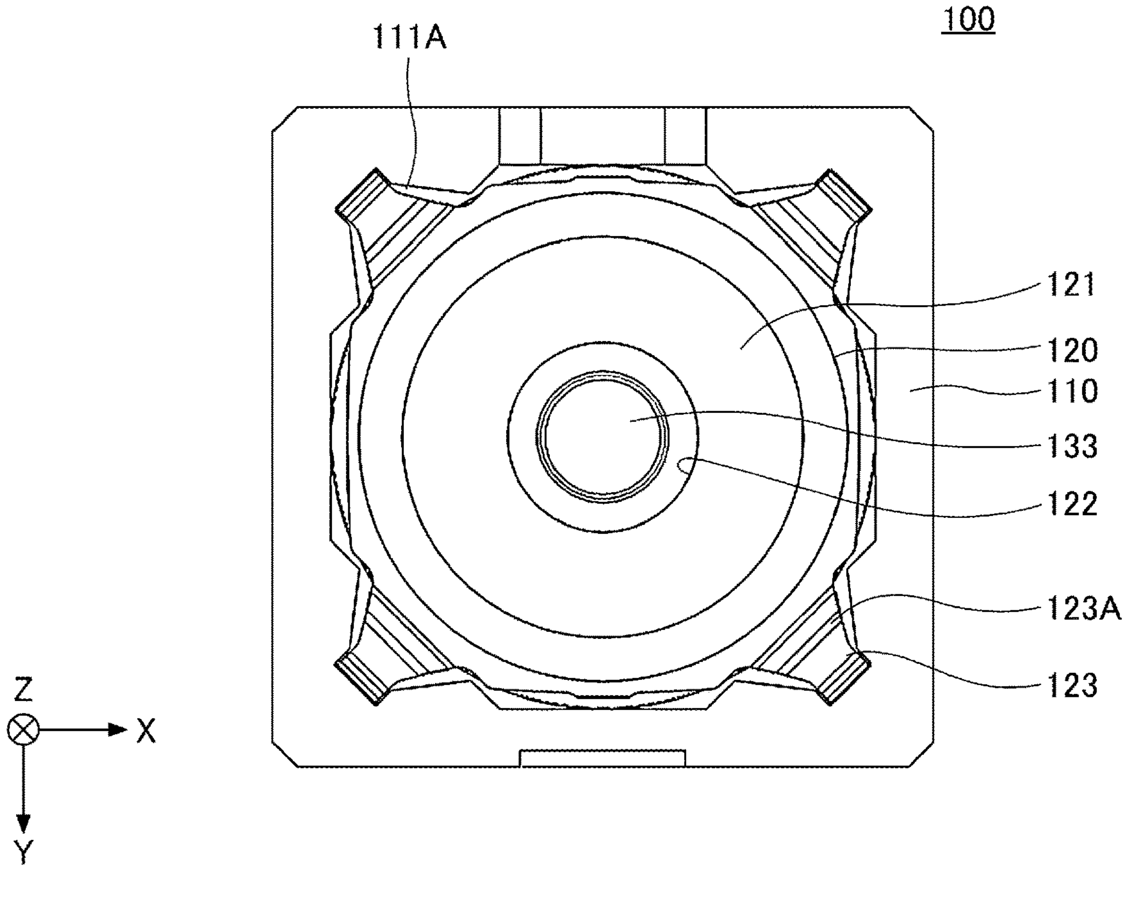
FIG. 3 is a bottom view illustrating the pressing mechanism of the push switch according to the first embodiment.
Figure 4:
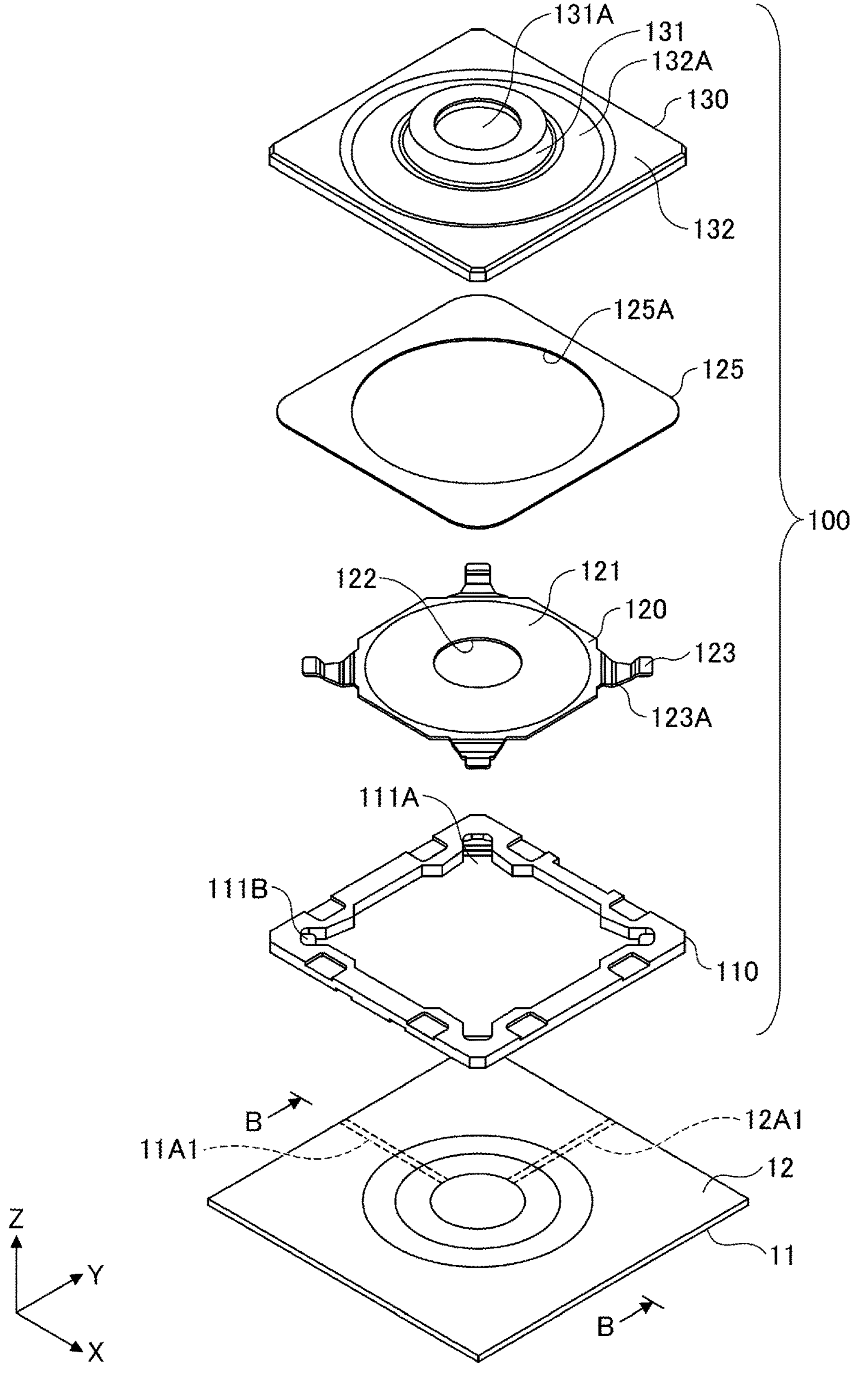
FIG. 4 is an exploded view illustrating the pressing mechanism of the push switch.
Figure 5:
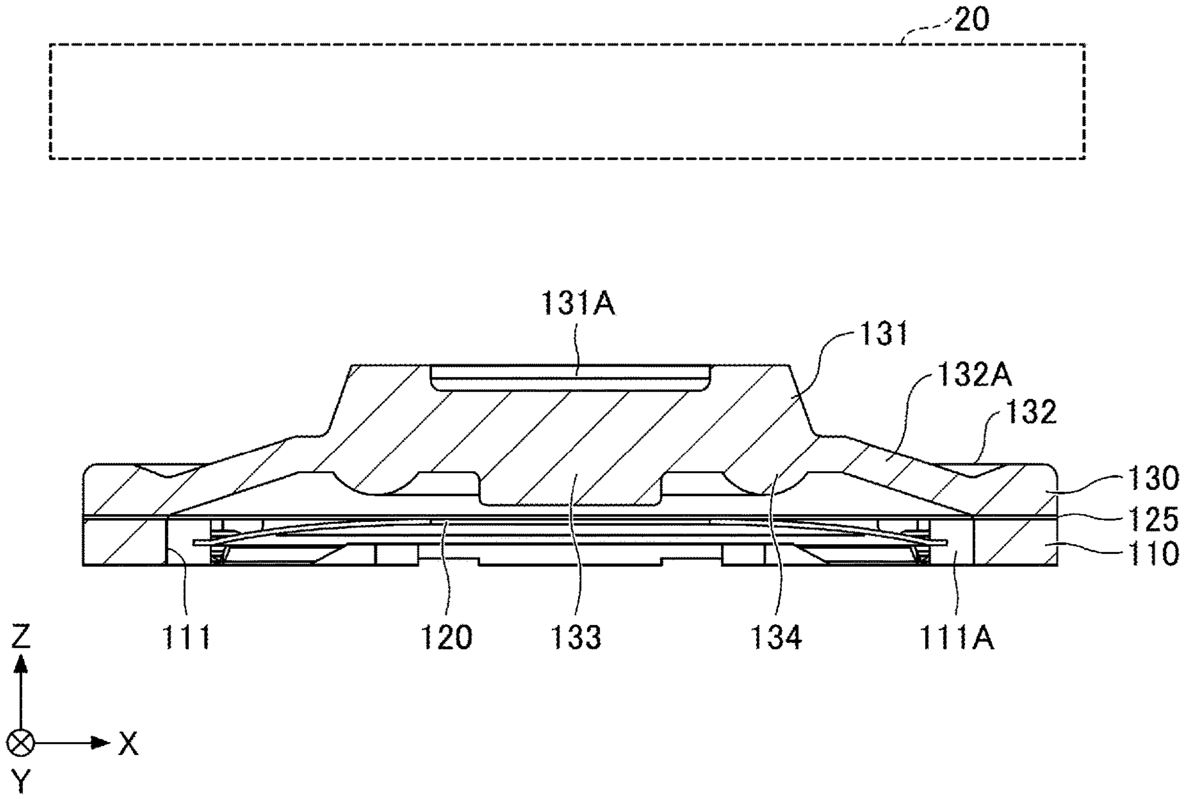
FIG. 5 is a cross-sectional view taken along A-A of FIG. 1.
Figure 6:
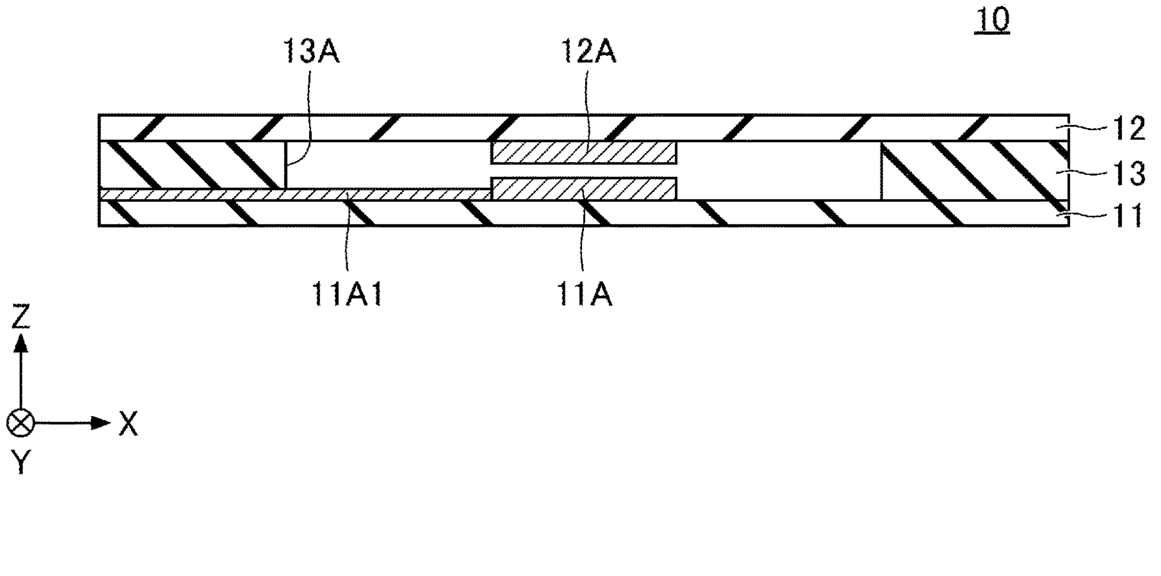
FIG. 6 is a cross-sectional view of a membrane switch.

FIG. 1 is a plan view illustrating a pressing mechanism 100 of the push switch according to the first embodiment. FIG. 2 is a side view illustrating the pressing mechanism 100 of the push switch according to the first embodiment. FIG. 3 is a bottom view illustrating the pressing mechanism 100 of the push switch according to the first embodiment. FIG. 4 is an exploded view illustrating the pressing mechanism 100 of the push switch. FIG. 5 is a cross-sectional view taken along A-A of FIG. 1. FIG. 6 is a cross-sectional view of a membrane switch 10.

In FIG. 5, for example, a key top 20 of a keyboard is shown above the pressing mechanism 100 of the push switch. The pressing mechanism 100 of the push switch can be used as, for example, a pressing mechanism for each key top 20 of the keyboard. A guide member in a pantograph structure may be provided between the pressing mechanism 100 of the push switch and the key top 20. However, the purpose of the pressing mechanism 100 of the push switch is not limited to the pressing mechanism for the key top 20. So long as the push switch can be operated by pressing the push switch, the pressing mechanism 100 of the push switch may be applied to any purpose.

Hereinafter, the explanation is made with reference to an XYZ coordinate system. Also, hereinafter, for the sake of convenience, a negative side in the Z axis direction is referred to as a lower side or downward, and a positive side in the Z axis direction is referred to as an upper side or upward, but they do not necessarily represent an absolute arrangement in the vertical direction. A plan view means a top view illustrating the XY plane as seen in the Z axis direction.

As illustrated in FIG. 1 and FIG. 2, the pressing mechanism 100 of the push switch includes a housing 110, a leaf spring 120, a thermocompression bonding sheet 125, and a stem 130. The pressing mechanism 100 of the push switch is provided on the membrane switch 10 (see FIG. 4). The pressing mechanism 100 of the push switch and the membrane switch 10 constitute a push switch.

As illustrated in FIG. 4 and FIG. 6, the membrane switch 10 includes a lower sheet 11, a fixed contact point 11A, an upper sheet 12, a movable contact point 12A, and a support portion 13. The lower sheet 11, the upper sheet 12, and the support portion 13 are insulators. The fixed contact point 11A and the movable contact point 12A are conductors. The fixed contact point 11A and the movable contact point 12A are connected to conductive traces 11A1, 12A1, respectively.

The lower sheet 11 and the upper sheet 12 are bonded with a support portion 13 sandwiched therebetween. The support portion 13 is formed with a through hole 13A in a circular shape at a central portion in a plan view, and a fixed contact point 11A provided on the upper surface of the lower sheet 11 and a movable contact point 12A provided on the lower surface of the upper sheet 12 are provided to face each other in the inside of the through hole 13A.

When the upper sheet 12 is not pressed from above, the fixed contact point 11A and the movable contact point 12B are not in a conductive state. When the movable contact point 10B is pressed from above, the fixed contact point 10A and the movable contact point 10B are brought into a conductive state.

When the stem 130 is pressed in the −Z direction, the pressing mechanism 100 of the push switch presses the movable contact point 12A of the membrane switch 10 in the −Z direction to the fixed contact point 11A. Accordingly, the membrane switch 10 is brought into a conductive state.

The housing 110 is made of resin, and is a plate-shaped member (housing) that has the same length in the X axis direction and the Y axis direction and that has a thickness in the Z axis direction.

The housing 110 has an accommodation portion 111 penetrating the housing 110 in the thickness direction. The lower surface of the housing 110 is attached by an adhesive sheet or the like to a portion of the upper sheet 12 of the membrane switch 10 that is supported by the support portion 13 in a plan view.

The leaf spring 120 is accommodated in the accommodation portion 111. The accommodation portion 111 is situated in the central portion of the housing 110 in a plan view. As illustrated in FIG. 4, the accommodation portion 111 includes leg accommodation portions 111A and support portions 111B. The leg accommodation portions 111A are portions extending from the inner peripheral portion of the accommodation portion 111 toward four corners of the housing 110 and are obtained by enlarging the accommodation portion 111. The leg accommodation portions 111A have a shape that does not penetrate the housing 110 to the lower surface of the housing 110 and rather has a shape recessed from the upper surface side. In other words, the leg accommodation portions 111A have a bottom-closed shape (i.e., a structure having a bottom). The support portions 111B are provided on the bottom portions of the leg accommodation portions 111A. The support portions 111B are portions constituting the bottoms of the leg accommodation portions 111A. The leg accommodation portions 111A accommodate legs 123 of the leaf spring 120, and the ends of the legs 123 are supported by the support portions 111B.

The leaf spring 120 is an example of a leaf spring member constituted by a metal leaf spring having elasticity and conductivity. The leaf spring 120 is provided in the accommodation portion 111.

As illustrated in FIG. 4, the leaf spring 120 includes a dome portion 121 in a bulging shape, an opening portion 122 provided in proximity to the top portion of the dome portion 121, and the legs 123 supporting the dome portion 121.

The dome portion 121 has a shape bulging in the +Z direction of FIG. 4 to form a dome shape and has a circular shape in an XY plan view. The dome portion 121 has a shape that can be operated so that its bulging direction can be inverted in response to a pressing operation from the bulging direction (+Z direction). The dome portion 121 has an elasticity so that, when the pressing force is released, the dome portion 121 returns back to the shape in direction of the original bulging shape.

Four legs 123 are provided to extend in the outer direction from the outer peripheral portion of the dome portion 121. The legs 123 extend in the outer direction and the −Z direction from the outer peripheral portion of the dome portion 121, and are bent to extend in the outer direction and the +Z direction at the bent portion 123A. Accordingly, the bent portions 123A protrude in the pressing direction (−Z direction) of the leaf spring 120 from the dome portion 121.

The bent portions 123A are not accommodated in the leg accommodation portions 111A. Portions of the legs 123 that are on the end sides with respect to the bent portions 123A are accommodated in the leg accommodation portions 111A, and the ends of the legs 123 are supported by the support portions 111B.

In this manner, the ends of the legs 123 are supported by the support portions 111B, so that the leaf spring 120 is stably held in the inside of the accommodation portion 111.

The legs 123 support the outer peripheral portion of the dome portion 121 when the dome portion 121 is operated to be inverted by a pressing operation, and the legs 123 have an elastic force to bend after the dome portion 121 is inverted. The above-described leaf spring 120 can be formed by a combination of punching, stamping, and bending processes of metal plates using a die.

The leaf spring 120 is provided in the accommodation portion 111 of the housing 110, and the leaf spring 120 is provided so that the stem 130 comes into contact with the top portion side of the dome portion 121.

The thermocompression bonding sheet 125 (see FIG. 4) is provided to bond the leaf spring 120 and the stem 130. The thermocompression bonding sheet 125 is a sheet-like member that bonds the leaf spring 120 and the stem 130 by melting in response to heating and curing in response to cooling. The thermocompression bonding sheet 125 has an opening portion 125A in a circular shape in a plan view. The size of the opening portion 125A is larger than the size of the dome portion 121 of the leaf spring 120. This is because the thermocompression bonding sheet 125 does not interfere with the inverting operation of the dome portion 121.

Figure 7:
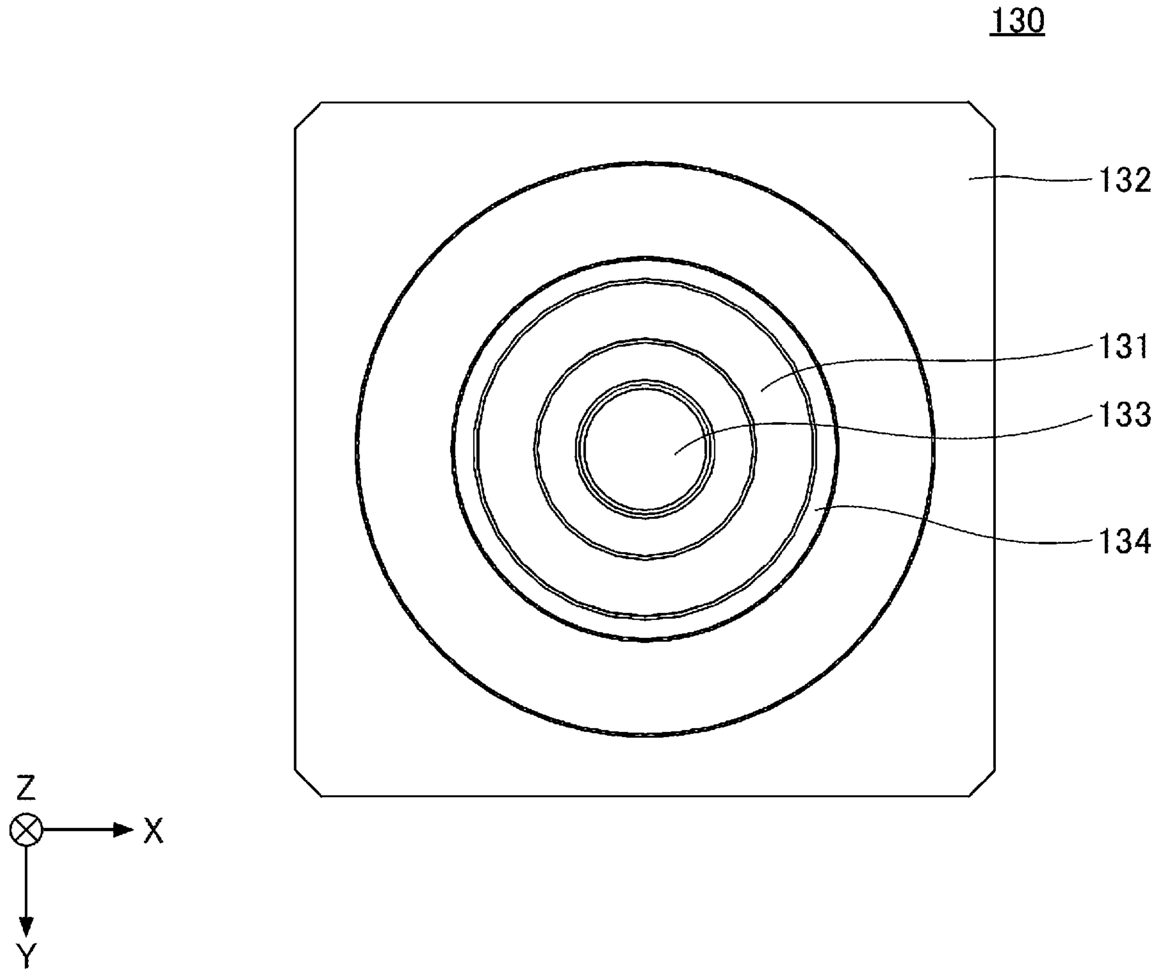
FIG. 7 is a bottom view of a stem.

Next, the stem 130 is explained. Hereinafter, the stem 130 is further explained with reference to FIG. 7. FIG. 7 is a bottom view of the stem 130.

As illustrated in FIGS. 4, 5, and 7, the stem 130 includes a base portion 131, a flange portion 132, a protruding portion 133, and a convex portion 134. For example, the stem 130 is made of resin, and is an example of an operation member. The user may operate the pressing mechanism 100 by directly touching the stem 130 with a hand or the like, or operate the pressing mechanism 100 via a member provided on or above the stem 130.

When the stem 130 is pressed in the Z direction, a pressing force is applied downward from the upper surface of the base portion 131. When pressing force is applied downward from the upper surface of the base portion 131 to cause the leaf spring 120 to perform an inverting operation, the stem 130 crushes and deforms in the Z direction, and the stem 130 has the structure as explained below in order to further deform the upper surface of the stem 130 downward. As described above, a displacement in the Z direction of the upper surface of the stem 130 when the upper surface of the stem 130 is further displaced downward after the leaf spring 120 performs the inverting operation is referred to as an over-stroke.

The base portion 131 is a portion situated in the center of the stem 130 and has a disk shape. A recessed portion 131A is formed in the upper surface of the base portion 131. The protruding portion 133 and the convex portion 134 are provided in the lower surface of the base portion 131.

The recessed portion 131A is a portion recessed downward from the upper surface of the base portion 131. The recessed portion 131A is in a circular shape in a plan view. The reason why the recessed portion 131A is provided is to reduce the area of the upper surface of the base portion 131, so that when a pressing force is applied downward from the upper surface of the base portion 131, the load applied to a unit area of the upper surface of the base portion 131 does not increase. In this manner, the base portion 131 is likely to crush in the Z direction, and a greater over-stroke can be obtained.

Furthermore, the reason why the recessed portion 131A is provided in the central portion of the upper surface of the base portion 131 is because of the following reasons. In order to stably cause the key top 20 to press the base portion 131, the area where the lower surface of the key top 20 and the upper surface of the base portion 131 are in contact with each other is preferably greater. Specifically, the dimensions in the X direction and the Y direction of the area where the lower surface of the key top 20 and the upper surface of the base portion 131 are in contact with each other are preferably greater. This is because the key top 20 is more stabilized with respect to the base portion 131 if the key top 20 and the base portion 131 are in contact with each other in the area of which the dimensions in the X direction and the Y direction are greater. Furthermore, this is because, when the recessed portion 131A is provided in the central portion of the upper surface of the base portion 131, it is not necessary to reduce the dimensions in the X direction and the Y direction of the area where the lower surface of the key top 20 and the upper surface of the base portion 131 are in contact with each other, and the key top 20 can stably press the upper surface around the recessed portion 131A of the base portion 131. In this manner, the recessed portion 131A is provided in the central portion of the upper surface of the base portion 131, so that the upper portion (the portion around the recessed portion 131A) of the base portion 131 constitutes a ridge portion in an annular shape in a plan view.

The flange portion 132 is a disk-shaped portion extending to the outer side in the diameter direction from the lower portion on the side of the base portion 131. The external shape of the flange portion 132 is a rectangular shape (square) in a plan view, and is situated around the base portion 131 in a circular shape in a plan view. An annular portion 132A (see FIG. 4) in the central portion of the flange portion 132 is a portion in an annular shape connected to the area around the base portion 131, and is a portion that is likely to be displaced in the Z direction.

The diameter of the flange portion 132 is adjusted to the inner diameter of the accommodation portion 111. Specifically, the shape and the size of the stem 130 in a plan view are substantially the same as the shape and the size of the portion of the accommodation portion 111 excluding the leg accommodation portions 111A. This is to reduce vibration of the stem 130 caused by vertical movement. FIG. 5 illustrates a cross section excluding the leg accommodation portions 111A.

The protruding portion 133 is an example of a first pressing portion, and is a portion in a disk shape that protrudes downward from the lower surface of the base portion 131. The protruding portion 133 is provided to press downward the center of the upper sheet 12 of the membrane switch 10 through the opening portion 122 of the leaf spring 120 when the upper surface of the base portion 131 is pressed downward to cause the leaf spring 120 to perform an inverting operation. Accordingly, the protruding portion 133 is provided in the central portion of the base portion 131 as seen from the lower surface side, and has a disk shape of which the diameter is smaller than the diameter of the opening portion 122.

The diameter of the protruding portion 133 is smaller than the diameter of the base portion 131. Specifically, the area of the protruding portion 133 as seen from the lower surface side is smaller than the area, in a cross section in a plane parallel to the XY plane, of the portion below the recessed portion 131A of the base portion 131. In other words, the protruding portion 133 is smaller than the base portion 131 in a plan view. This is because, when the stem 130 is pressed from above, the load applied to the protruding portion 133 per unit area is increased to be greater than the load applied to the base portion 131 per unit area, so that the protruding portion 133 is likely to deform and crush in the Z direction. In this case, the base portion 131 also crushes in the Z direction, but the protruding portion 133 is more likely to crush in the Z direction than the base portion 131, so that a greater over-stroke can be obtained.

Furthermore, the lower end of the protruding portion 133 is situated in the −Z direction with respect to the convex portion 134 when the stem 130 is not pressed in the −Z direction. This is because the protruding portion 133 presses downward the center of the upper sheet 12 of the membrane switch 10 through the opening portion 122 of the leaf spring 120 and protrudes more greatly in the −Z direction than the convex portion 134 that presses the dome portion 121 around the opening portion 122, so that the user can easily press the membrane switch 10.

The convex portion 134 is an example of a second pressing portion. The convex portion 134 protrudes downward from the lower surface of the base portion 131, and is formed in an annular shape on the outer side of the protruding portion 133 so as to enclose the protruding portion 133. Specifically, the protruding portion 133 is provided on the inner side of the convex portion 134 in an annular shape in a plan view. The convex portion 134 is provided at the position that comes into contact with the dome portion 121 around the opening portion 122 by avoiding the opening portion 122 situated in the central portion of the dome portion 121.

The convex portion 134 is provided to press downward the dome portion 121 of the leaf spring 120 to cause the dome portion 121 to perform an inverting operation. With the convex portion 134, the user can easily press the dome portion 121 downward, and a structure for more reliably performing an inverting operation can be achieved. Furthermore, with the protruding portion 133 provided on the inner side of the convex portion 134 in an annular shape in a plan view, it is possible to achieve a structure in which the protruding portion 133 can be provided so as to be able to easily pass through the opening portion 122 of the leaf spring 120, and when the stem 130 is pressed downward, a stress is readily applied to the protruding portion 133. It is sufficient for the convex portion 134 to be able to uniformly press the dome portion 121 of the leaf spring 120 in the downward direction, and therefore, the convex portion 134 is not limited to the structure in the annular shape enclosing the protruding portion 133, and may instead be in a belt shape such as a rectangular belt shape.

The convex portion 134 in an annular shape and the opening portion 122 in the circular shape are of similar shapes. Being of similar shapes means that both of the convex portion 134 and the opening portion 122 are of circular shapes. The convex portion 134 and the opening portion 122 are not limited to be in a circular shape, and may be in an elliptic shape, a polygonal shape having three or more sides, or the like.

In the initial state in which the stem 130 is not pressed, the convex portion 134 and the dome portion 121 are spaced apart from each other, and the protruding portion 133 is situated above the opening portion 122 of the leaf spring 120 (see FIG. 5), so that the membrane switch 10 is not pressed. Accordingly, the membrane switch 10 is in a non-conductive state.

When the base portion 131 of the stem 130 is pressed to cause the convex portion 134 to press the dome portion 121 to a certain extent, the dome portion 121 reaches an inverted state, and the protruding portion 133 presses downward a portion of the upper sheet 12 of the membrane switch 10 where the movable contact point 12A is provided through the opening portion 122 of the leaf spring 120. Accordingly, the membrane switch 10 attains a conductive state.

In this state, the dome portion 121 in the inverted state presses a portion around the support portion 13 of the membrane switch 10, and accordingly, the dome portion 121 is in such a state that the dome portion 121 is not displaced downward anymore.

Furthermore, when the base portion 131 of the stem 130 is further pressed, the stem 130 crushes in the Z direction, and accordingly, the upper surface of the base portion 131 is displaced downward, and at this occasion, an over-stroke can be obtained.

When the pressing operation of the stem 130 is released, the stem 130 returns back to the initial state by the elastic force of the leaf spring 120.

Figure 8:
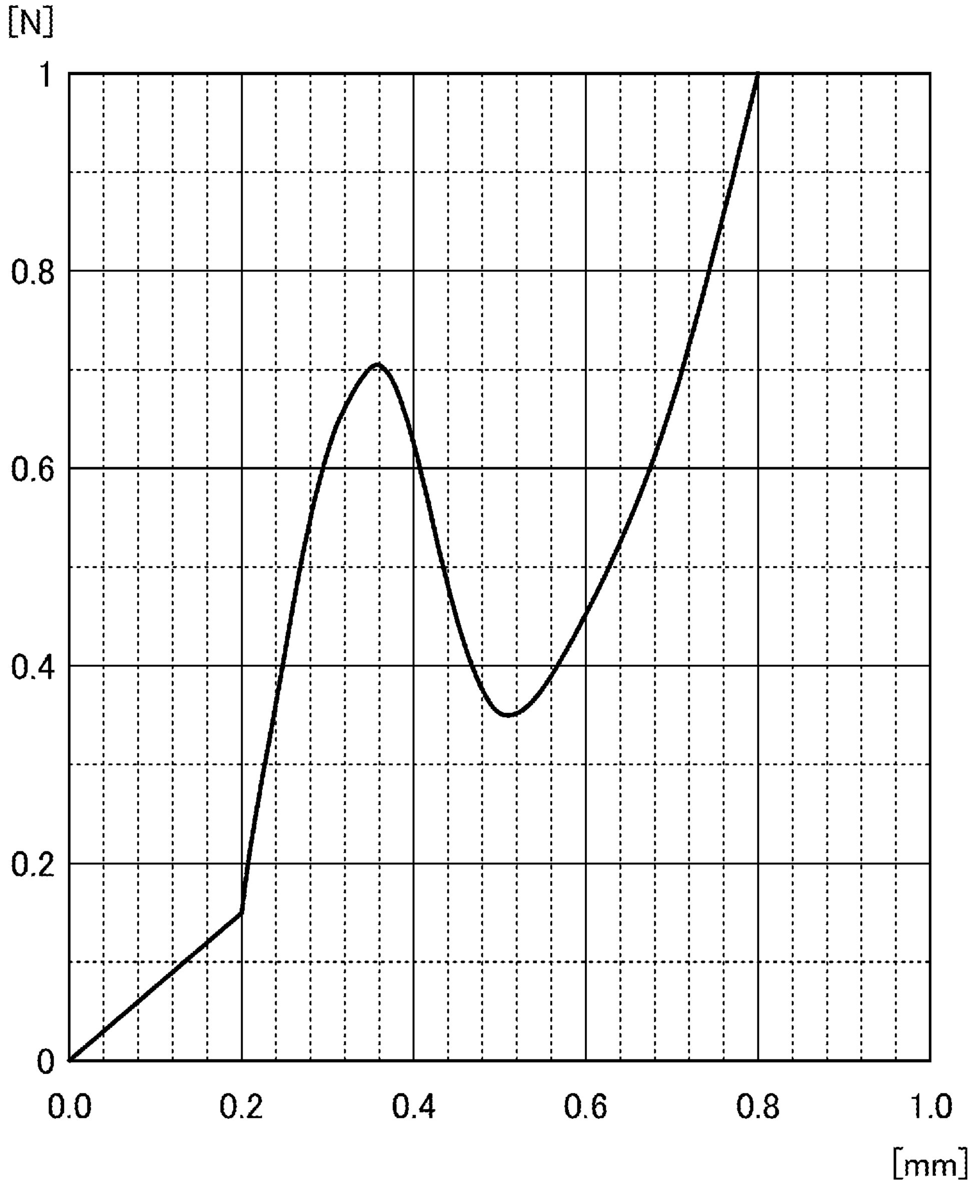
FIG. 8 is a force-stroke (FS) curve of the pressing mechanism of the push switch.

FIG. 8 is a force-stroke (FS) curve of the pressing mechanism 100 of the push switch. The horizontal axis denotes a stroke (S) by which the stem 130 is pushed downward, and the vertical axis denotes a force (F) required to press to push the stem 130 downward. The force (F) is the operation load of the stem 130.

A stroke of 0 mm to 0.2 mm in the initial state is a section in which the convex portion 134 of the stem 130 is not in contact with the dome portion 121 of the leaf spring 120. Such a section is referred to as a free stroke. The operation load of the section of the free stroke is a load that is required to displace the base portion 131 of the stem 130 downward with respect to the flange portion 132. In the section of the free stroke, the annular portion 132A deforms close to the center of the flange portion 132, so that the base portion 131 displaces downward with respect to the flange portion 132.

When the convex portion 134 of the stem 130 is in contact with the dome portion 121 of the leaf spring 120 in the initial state, the section of the free stroke ends, and the stroke starts from the position of 0.2 mm on the force-stroke (FS) curve. In this manner, the section of the free stroke does not have to be provided.

When the stroke attains 0.2 mm, the convex portion 134 of the stem 130 comes into contact with the dome portion 121 of the leaf spring 120. When the stroke further increases, the convex portion 134 presses the dome portion 121 downward, and when the stroke attains about 0.36 mm, the operation load becomes about 0.7 N, which is the maximum value.

When the stroke exceeds about 0.36 mm, the dome portion 121 performs an inverting operation, and when the stroke attains about 0.7 mm, the operation load attains about 0.35 N, which is the minima. When the dome portion 121 performs an inverting operation, the protruding portion 133 of the stem 130 presses the membrane switch 10 by passing through the opening portion 122 of the leaf spring 120, and accordingly, the membrane switch 10 attains a conductive state (ON).

When the stroke exceeds about 0.7 mm, the dome portion 121 is held in an inverted state to enter a section of an over stroke in which the stem 130 crushes in the Z direction. The section of the over stroke is a section in which the stroke is about 0.7 mm to 0.8 mm. When the stroke is 0.8 mm, the operation load attains 1 N.

As described above, the leaf spring 120 having the opening portion 122 in the central portion of the dome portion 121 and the stem 130 having the protruding portion 133 pressing the membrane switch 10 through the opening portion 122 and the convex portion 134 pressing the dome portion 121 are used, so that a tactile sensation caused by the inverting operation of the leaf spring 120 can be generated on the stem 130, and a sufficiently large over stroke can be obtained after the inverting operation of the leaf spring 120 is completed.

Therefore, the pressing mechanism 100 of the push switch that achieves both a good tactile sensation and a reduction in the thickness can be provided. The good tactile sensation is an effect obtained from the over stroke of the stem 130. The reduction in the thickness is an effect obtained when the protruding portion 133 of the stem 130 passes through the opening portion 122 of the leaf spring 120 and presses the membrane switch 10.

Although the adhesive sheet 150 is used in the above explanation, the above explanation is also applicable to an adhesive agent, a pressure-sensitive adhesive agent, or an adhesive sheet.

Although the leaf spring 120 have the four legs 123 in the above explanation, the number of the legs 123 of the leaf spring 120 is not limited thereto, so long as the leaf spring 120 can be supported with respect to the housing 110.

Figure 9:
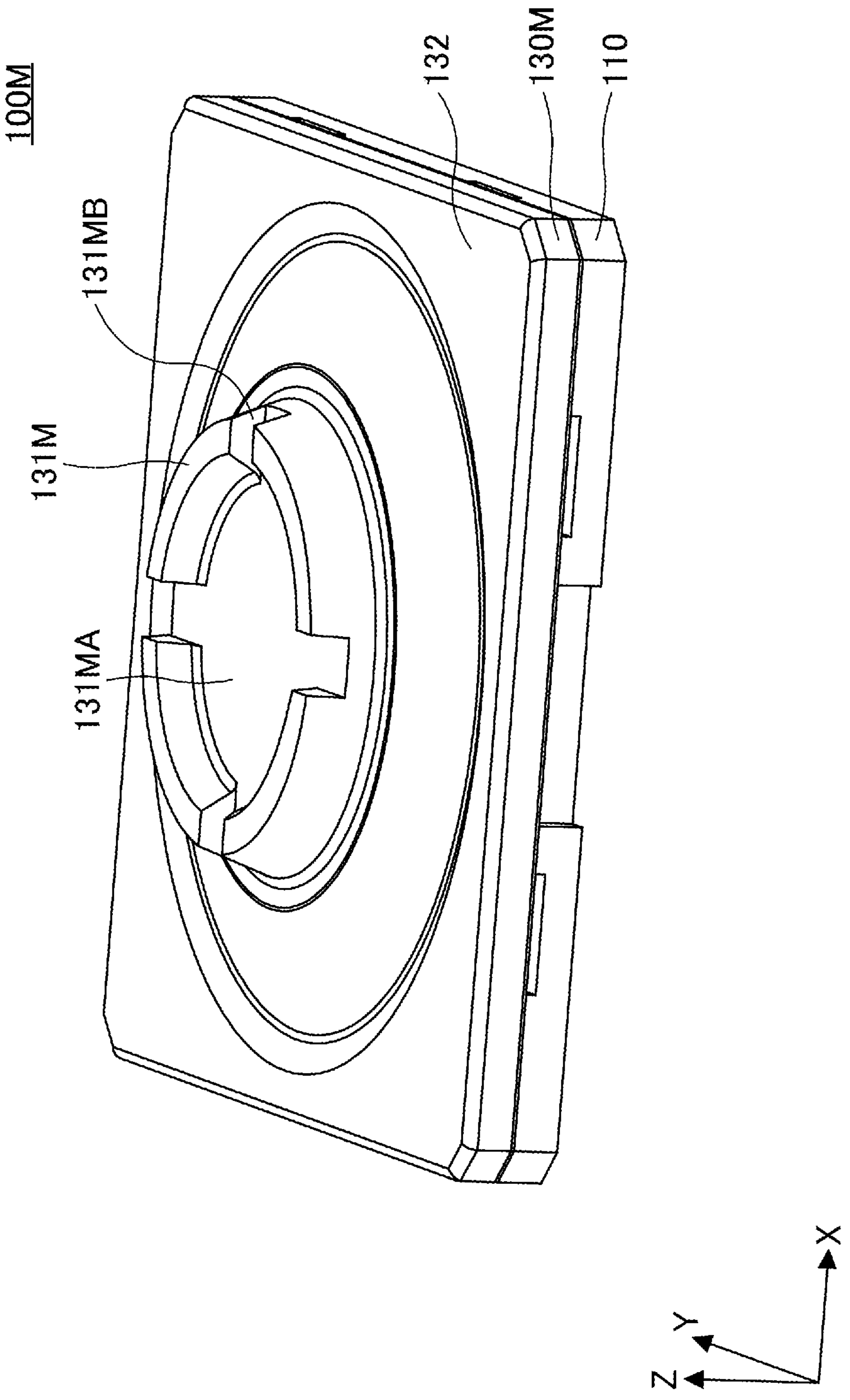
FIG. 9 is a perspective view illustrating a pressing mechanism of a push switch according to a modified embodiment of the first embodiment.

Furthermore, the pressing mechanism 100 of the push switch may be modified as illustrated in FIG. 9. FIG. 9 is a perspective view illustrating the pressing mechanism 100M of the push switch according to the modified embodiment of the first embodiment. The pressing mechanism 100M of the push switch is different from the pressing mechanism 100 of the push switch as illustrated in FIG. 1 to FIG. 4 in that the pressing mechanism 100M includes a stem 130M instead of the stem 130.

The stem 130M includes a base portion 131M and a flange portion 132. Furthermore, although not illustrated in FIG. 9, the stem 130M includes a protruding portion 133 and a convex portion 134 (see FIG. 5 and FIG. 7). For example, the stem 130M is made of resin, and is an example of an operation member. The stem 130M includes the base portion 131M instead of the base portion 131 of the stem 130.

The base portion 131M is a portion situated in the center of the stem 130M and has a disk shape. The base portion 131M includes a recessed portion 131MA formed in the upper surface and groove portions 131MB. Like the recessed portion 131A (see FIG. 1 and FIG. 4), the recessed portion 131MA is provided in the central portion of the upper surface of the base portion 131M. The groove portions 131MB are formed to be recessed downward from the upper surface in the upper portion of the base portion 131M (specifically, a portion enclosing the recessed portion 131MA). The groove portions 131MB are provided in order to allow the upper portion of the base portion 131M to be easily crushed when it is pressed from above. For example, four groove portions 131MB are provided with regular intervals in the circumferential direction of the upper portion of the base portion 131M. Even when the groove portions 131MB are formed, the upper portion of the base portion 131M is in an annular shape in a plan view.

As described above, the recessed portion 131MA is provided in the central portion of the upper surface of the base portion 131M, and four groove portions 131MB are provided in the annular portion of the upper portion of the base portion 131M, so that the area of the upper surface of the base portion 131M can be reduced. Accordingly, when a downward pressing force is applied from the upper surface of the base portion 131M, the load applied per unit area of the upper surface of the base portion 131M increases, which allows the base portion 131M to easily crush in the Z direction, so that a larger over stroke can be obtained. Therefore, the pressing mechanism 100M of the push switch that achieves both a good tactile sensation and a reduction in the thickness can be provided.

The number of groove portions 131MB is not limited to four, and may be, for example, 3, 8, 16, and so on. The number of groove portions 131MB is preferably two or more. With two or more groove portions 131MB, when a downward pressing force is applied from the upper surface of the base portion 131M, the load applied per unit area of the upper surface of the base portion 131M can be easily uniformized, so that a better tactile sensation can be provided. The multiple groove portions 131MB are provided with regular intervals in the circumferential direction of the upper portion of the base portion 131M. This is because, with multiple groove portions 131MB provided with regular intervals in the circumferential direction, when a downward pressing force is applied from the upper surface of the base portion 131M, the load applied per unit area of the upper surface of the base portion 131M can be uniformized, and an even better tactile sensation can be provided.

Second Embodiment

Figure 10:
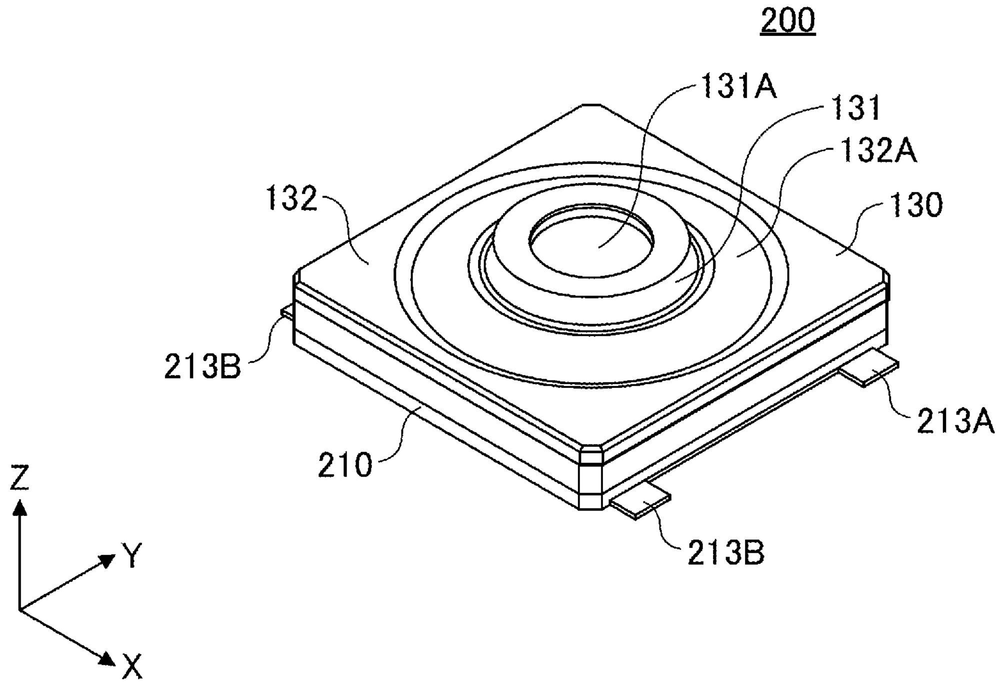
FIG. 10 is a drawing illustrating a push switch according to a second embodiment.
Figure 11:
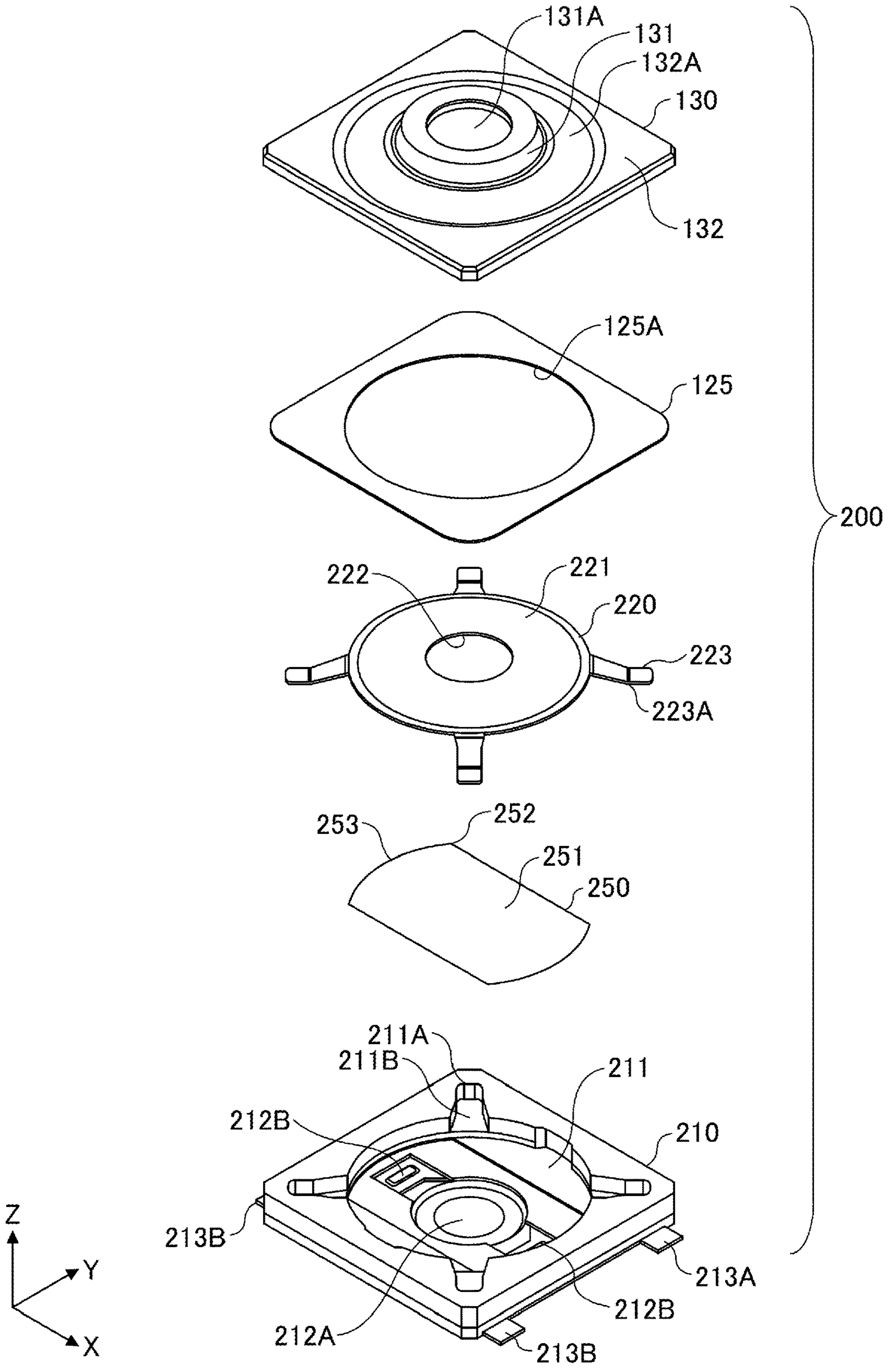
FIG. 11 is an exploded view illustrating the push switch.

FIG. 10 is a drawing illustrating a push switch 200 according to the second embodiment. FIG. 11 is an exploded view illustrating the push switch 200. In the second embodiment, elements that are substantially the same as those of the first embodiment are denoted with the same reference numerals, and description thereabout is omitted.

The push switch 200 includes a housing 210, a leaf spring 250, a leaf spring 220, a thermocompression bonding sheet 125, and a stem 130. Hereinafter, FIG. 5 is incorporated herein by reference as an explanation about the stem 130. The push switch 200 may include the stem 130M as illustrated in FIG. 9 instead of the stem 130.

The housing 210 is made of resin, and is a plate-shaped member (housing) that has the same length in the X axis direction and the Y axis direction and that has a thickness in the Z axis direction. The housing 210 is different from the housing 110 of the first embodiment in that the accommodation portion 211 has a bottom. A central contact point 212A and side contact points 212B are provided in the accommodation portion 211. The central contact point 212A is an example of a first fixed contact point member, and the side contact points 212B are an example of second fixed contact point member.

The central contact point 212A is provided in the central portion of the bottom portion of the accommodation portion 211, and is connected to a terminal 213A protruding to the outside of the housing 210. The side contact points 212B are provided in the side portions of the bottom portion of the accommodation portion 211, and are connected to terminal 213B protruding to the outside of the housing 210.

In the accommodation portion 211, a leaf spring 250 and a leaf spring 220 are accommodated to overlap each other. The leaf spring 220 is laid on the leaf spring 250. The accommodation portion 211 is situated in the central portion of the housing 210 in a plan view.

The leaf spring 250 is an example of a movable contact point member. The leaf spring 250 is curved so that a central portion 251 swells upward with respect to four corners 252, and sides 253 extending in the Y direction and curved to swell the ±X directions are in contact with the side contact points 212B. When the central portion 251 is pressed downward from above, the leaf spring 250 performs an inverting operation so that the central portion 251 comes into contact with the central contact point 212A. Accordingly, the central contact point 212A and the side contact points 212B are brought into a conductive state by the leaf spring 250.

The accommodation portion 211 includes leg accommodation portions 211A and support portions 211B. The leg accommodation portions 211A and the support portions 211B are substantially the same as the leg accommodation portions 111A and the support portions 111B of the housing 110 according to the first embodiment.

The leaf spring 220 is an example of a leaf spring member, and is a leaf spring having elasticity and conductivity. The leaf spring 220 does not have to have conductivity, and is made of metal, resin, or the like. The leaf spring 220 is provided on the leaf spring 250 in the accommodation portion 211.

The shape and the function of the leaf spring 220 are substantially the same as the leaf spring 120 according to the first embodiment, and the leaf spring 220 includes a dome portion 221 in a bulging shape, an opening portion 222 provided in proximity to the top portion of the dome portion 221, and the legs 223 supporting the dome portion 221.

The leaf spring 220 includes four legs 223, and each of the legs 223 has a bent portion 223A. The legs 223 and the bent portions 223A are substantially the same as the legs 123 and the bent portions 123A of the leaf spring 120 of the first embodiment. The ends of the legs 223 are supported by the support portions 211B, so that the leaf spring 220 is stably held in the inside of the accommodation portion 211.

With the push switch 200 according to the second embodiment, in the initial state in which the stem 130 is not pressed, the convex portion 134 (see FIG. 5) and the dome portion 221 are spaced apart from each other, and the protruding portion 133 (see FIG. 5) is situated above the opening portion 222 of the leaf spring 220, so that the central portion 251 of the leaf spring 250 is not pressed. Accordingly, the central contact point 212A and the side contact points 212B are in a non-conductive state.

When the base portion 131 of the stem 130 is pressed to cause the convex portion 134 to press the dome portion 221 to a certain extent, the dome portion 221 attains an inverted state, and the protruding portion 133 presses downward the central portion 251 of the leaf spring 250 through the opening portion 222 of the leaf spring 220. Accordingly, the membrane switch 10 attains a conductive state. Accordingly, the central contact point 212A and the side contact points 212B are brought into a conductive state by the leaf spring 250, and the push switch 200 attains a conductive state.

In this state, the inverted dome portion 221 is pressing the central contact point 212A via the central portion 251 of the inverted leaf spring 250, and accordingly, the dome portion 221 is in such state that it is not displaced downward anymore. The central portion 251 of the leaf spring 250 is in contact with the central contact point 212A, and the protruding portion 133 is in such a state that it is pressing the central portion 251 of the leaf spring 250 through the opening portion 222.

Furthermore, when the base portion 131 of the stem 130 is pressed, the stem 130 crushes in the Z direction, so that the upper surface of the base portion 131 is displaced downward, and at this occasion, an over stroke is obtained.

When the pressing operation of the stem 130 is released, the stem 130 returns back to the initial state according to the elastic force of the leaf spring 220.

As described above, the leaf spring 220 having the opening portion 222 in the central portion of the dome portion 221 and the stem 130 having the protruding portion 133 pressing the central portion 251 of the leaf spring 250 through the opening portion 222 and the convex portion 134 pressing the dome portion 221 are used, so that a tactle sensation caused by the inverting operation of the leaf spring 220 can be generated on the stem 130, and a sufficiently large over stroke can be obtained after the inverting operation of the leaf spring 220 is completed.

Therefore, the push switch 200 that achieves both a good tactile sensation and a reduction in the thickness can be provided. The good tactile sensation is an effect obtained from the over stroke of the stem 130. The reduction in the thickness is an effect obtained when the protruding portion 133 of the stem 130 passes through the opening portion 222 of the leaf spring 220 and presses the central portion 251 of the leaf spring 250.

Although the adhesive sheet 150 is used in the above explanation, the above explanation is also applicable to an adhesive agent, a pressure-sensitive adhesive agent, or an adhesive sheet.

Although the leaf spring 220 have the four legs 223 in the above explanation, the number of the legs 223 of the leaf spring 220 is not limited thereto, so long as the leaf spring 220 can be supported with respect to the housing 210.

In a case where the leaf spring 220 is made of metal, the push switch 200 does not have to include the leaf spring 250. In this case, four side contact points 212B are provided below bent portions 223A of four legs 223 of the leaf spring 220, so that four side contact points 212B are kept in contact with the bent portions 223A of the four legs 223 of the leaf spring 220. Furthermore, when the dome portion 221 of the leaf spring 220 made of metal is pressed by the convex portion 134 of the stem 130 to perform an inverting operation, the dome portion 221 may come into contact with the central contact point 212A to cause the central contact point 212A and the side contact points 212B to be in a conductive state via the leaf spring 220. In this case, the protruding portion 133 of the stem 130 passes through the opening portion 222 of the leaf spring 220 and presses the central portion of the central contact point 212A.

Third Embodiment

Figure 12:
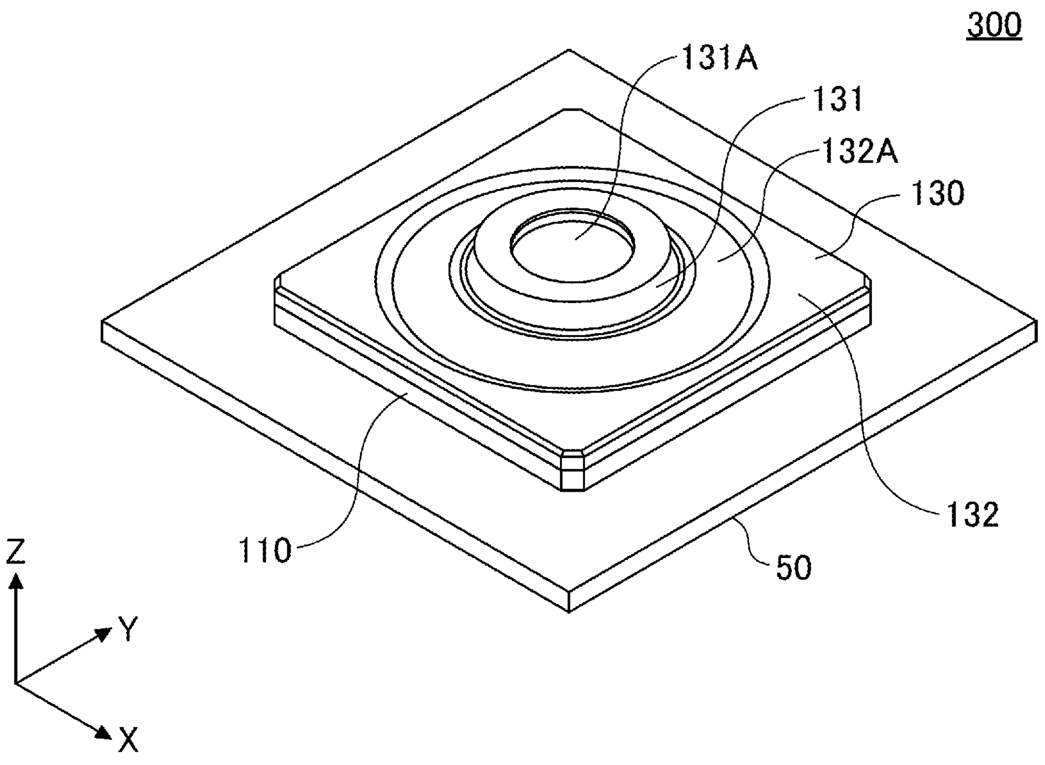
FIG. 12 is a drawing illustrating a pressing mechanism of a push switch according to a third embodiment.
Figure 13:
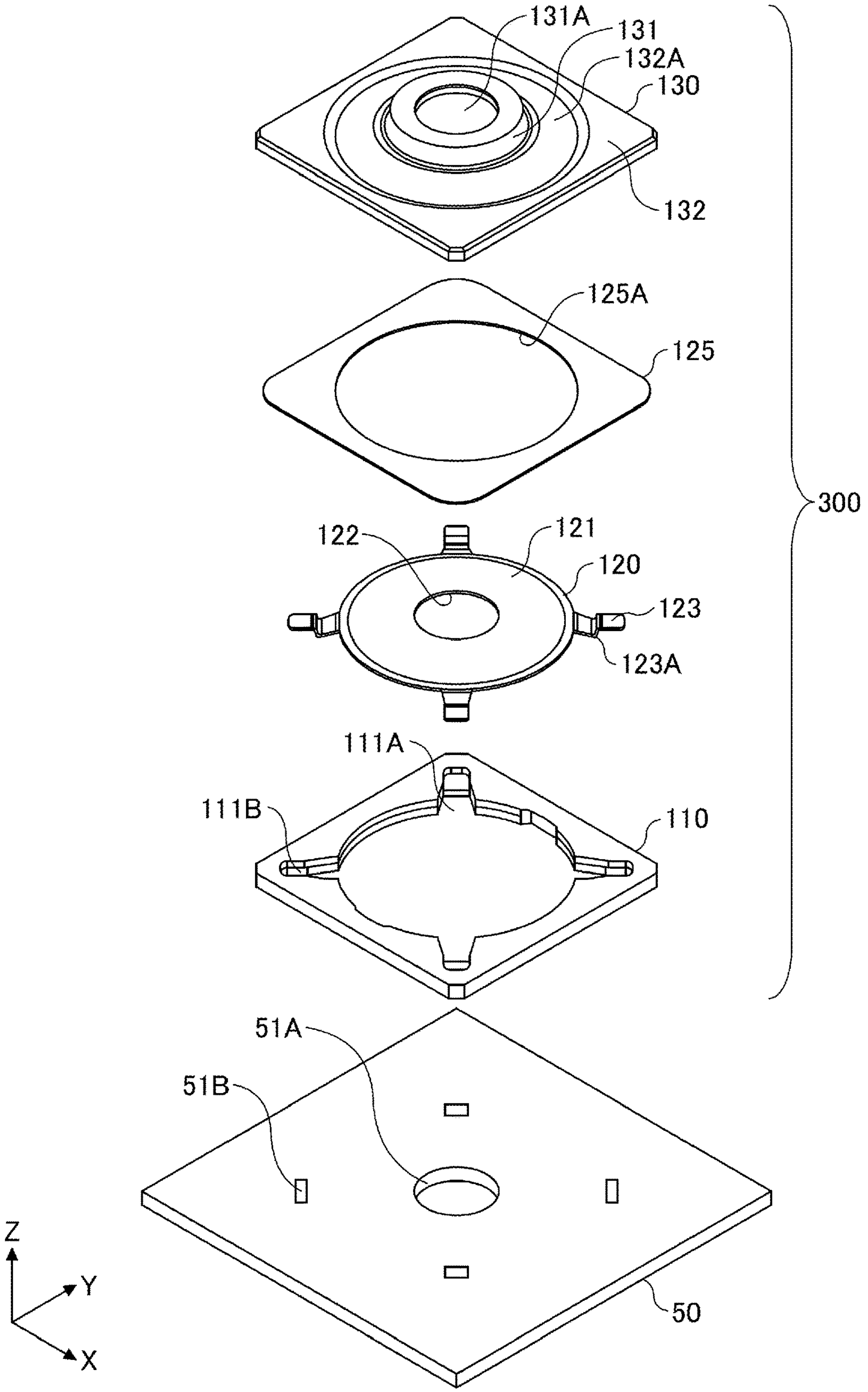
FIG. 13 is an exploded view illustrating the pressing mechanism of the push switch.

FIG. 12 is a drawing illustrating the pressing mechanism 300 of the push switch according to the third embodiment. FIG. 13 is an exploded view illustrating the pressing mechanism 300 of the push switch. In the third embodiment, elements that are substantially the same as those of the first embodiment are denoted with the same reference numerals, and description thereabout is omitted.

The pressing mechanism 300 of the push switch includes a housing 110, a leaf spring 120, a thermocompression bonding sheet 125, and a stem 130. Hereinafter, FIG. 5 is incorporated herein by reference as an explanation about the stem 130. The pressing mechanism 300 of the push switch may include the stem 130M as illustrated in FIG. 9 instead of the stem 130.

The pressing mechanism 300 of the push switch is implemented on a substrate 50. The pressing mechanism 300 of the push switch and the substrate 50 constitute the push switch.

The substrate 50 is a conductive trace substrate, and includes a central contact point 51A and side contact points 51B on the upper surface. The central contact point 51A and the side contact points 51B are connected to terminals, not illustrated, via conductive traces and the like embedded in the substrate 50 or provided on the lower surface.

The housing 110 is made of resin, and is a plate-shaped member (housing) that has the same length in the X axis direction and the Y axis direction and that has a thickness in the Z axis direction. The leaf spring 120 is accommodated in the accommodation portion 111.

The leaf spring 120 is an example of a leaf spring-shaped movable contact point member, and is a leaf spring having elasticity and conductivity. The leaf spring 120 is made of metal, and has conductivity. The lower surfaces of the bent portions 123A of the four legs 123 of the leaf spring 120 are in contact with the side contact points 51B.

With the pressing mechanism 300 of the push switch according to the third embodiment, in the initial state in which the stem 130 is not pressed, the convex portion 134 (see FIG. 5) and the dome portion 121 are spaced apart from each other, and the protruding portion 133 (see FIG. 5) is situated above the opening portion 122 of the leaf spring 120. The convex portion 134 (see FIG. 5) is not pressing the dome portion 121 downward, and the leaf spring 120 is not performing an inverting operation, and accordingly, the central contact point 51A and the dome portion 121 are not in contact with each other, and the central contact point 51A and the side contact points 51B are in a non-conductive state.

When the base portion 131 of the stem 130 is pressed to cause the convex portion 134 to press the dome portion 121 to a certain extent, the dome portion 121 attains an inverted state, and the protruding portion 133 presses the central contact point 51A downward through the opening portion 122 of the leaf spring 120. The inverted dome portion 121 and the central contact point 51A come into contact with each other, so that the leaf spring 120 causes the central contact point 51A and the side contact points 51B to be in a conductive state.

Furthermore, in this state, the inverted dome portion 121 is pressing the outer circumferential portion of the inverted central contact point 51A, and accordingly, the dome portion 121 is in such a state that the dome portion 121 is not displaced downward anymore. Furthermore, the protruding portion 133 is in such a state that the protruding portion 133 is pressing the central portion of the central contact point 51A through the opening portion 122.

Furthermore, when the base portion 131 of the stem 130 is pressed, the stem 130 crushes in the Z direction, and accordingly, the upper surface of the base portion 131 is displaced downward, and at this occasion, an over-stroke can be obtained.

When the pressing operation of the stem 130 is released, the stem 130 returns back to the initial state by the elastic force of the leaf spring 120.

As described above, the leaf spring 120 having the opening portion 122 in the central portion of the dome portion 121 and the stem 130 having the protruding portion 133 pressing the central portion of the central contact point 51A through the opening portion 122 and the convex portion 134 pressing the dome portion 121 are used, so that a tactile sensation caused by the inverting operation of the leaf spring 120 can be generated on the stem 130, and a sufficiently large over stroke can be obtained after the inverting operation of the leaf spring 120 is completed.

Therefore, the pressing mechanism 300 of the push switch that achieves both a good tactile sensation and a reduction in the thickness can be provided. The good tactile sensation is an effect obtained from the over stroke of the stem 130. The reduction in the thickness is an effect obtained when the protruding portion 133 of the stem 130 passes through the opening portion 122 of the leaf spring 120 and presses the central contact point 51A.

Although the adhesive sheet 150 is used in the above explanation, the above explanation is also applicable to an adhesive agent, a pressure-sensitive adhesive agent, or an adhesive sheet.

Although the leaf spring 120 have the four legs 123 in the above explanation, the number of the legs 123 of the leaf spring 120 is not limited thereto, so long as the leaf spring 120 can be supported with respect to the housing 110.

Furthermore, in a case where the leaf spring 120 is made of insulators such as resin, the leaf spring 250 according to the second embodiment may be provided between the leaf spring 120 and the substrate 50, so that the leaf spring 250 pressed by the leaf spring 120 may cause the central contact point 51A and the side contact points 51B to be in a conductive state. In this case, the convex portion 134 causes the leaf spring 120 to perform an inverting operation to cause the dome portion 121 to press the leaf spring 250 downward to perform an inverting operation, so that the leaf spring 250 causes the central contact point 51A and the side contact points 51B to be in a conductive state. Furthermore, the protruding portion 133 presses the leaf spring 250 through the opening portion 122, and accordingly, the leaf spring 250 is pressed against the central contact point 51A. The protruding portion 133 crushes in the Z direction while it is in contact with the central contact point 51A via the leaf spring 250, so that an over stroke is obtained.

Although the pressing mechanism of the push switch and the push switch according to the embodiment of the present disclosure have been hereinabove explained, the present invention is not limited to the embodiment disclosed hereinabove, and can be modified and changed without departing from the subject matter described in the attached claims.

What is claimed is:

1. A pressing mechanism of a push switch, the pressing mechanism comprising:
- an operation member configured to be pressed; and
- a leaf spring member that includes a dome portion bulging in a dome shape and an opening portion provided in a central portion of the dome portion, the leaf spring member generating a tactile sensation on the operation member by an inverting operation of the dome portion in response to being pressed by the operation member,
- wherein the operation member includes
  - a first pressing portion configured to press a movable contact point member against a fixed contact point member through the opening portion,
  - a second pressing portion configured to press the dome portion, and
  - a base portion having a pressing surface,
- wherein the first pressing portion and the second pressing portion are provided on the pressing surface of the base portion such that the first pressing portion is disposed at a center area and the second pressing portion is disposed outside the first pressing portion in a plan view, and
- wherein the first pressing portion and the second pressing portion are spaced apart from each other on the pressing surface of the base portion.

2. The pressing mechanism according to claim 1, wherein the movable contact point member and the fixed contact point member are made of a membrane sheet.

3. The pressing mechanism according to claim 1, wherein the operation member includes a recessed portion provided in a portion where a pressing force of a pressing operation is applied.

4. The pressing mechanism according to claim 1, wherein the second pressing portion is in a ring shape in the plan view, and
- the first pressing portion is provided on an inner side of the second pressing portion in the ring shape in the plan view.

5. The pressing mechanism according to claim 1, wherein the second pressing portion and the opening portion are of similar shapes in the plan view.

6. The pressing mechanism according to claim 1, wherein
- the first pressing portion is smaller than the base portion in the plan view.

7. The pressing mechanism according to claim 1, wherein the first pressing portion protrudes toward the movable contact point member with respect to the second pressing portion.

* * * * *